United States Patent [19]
Yeomans

[11] Patent Number: 4,653,338
[45] Date of Patent: Mar. 31, 1987

[54] APPARATUS FOR DRIVING A MEMBER

[75] Inventor: Hugh D. Yeomans, Ventura, Calif.

[73] Assignee: Hall Surgical Division of Zimmer, Inc., Carpinteria, Calif.

[21] Appl. No.: 700,120

[22] Filed: Feb. 11, 1985

[51] Int. Cl.⁴ .............................................. F16H 3/08
[52] U.S. Cl. ...................... 74/318; 74/319; 74/322; 74/378; 173/48; 173/163
[58] Field of Search ................ 74/318, 319, 322, 323, 74/371, 372, 378; 173/48, 163

[56] References Cited

U.S. PATENT DOCUMENTS

| | | | |
|---|---|---|---|
| 1,581,838 | 4/1926 | Claasen | 74/318 |
| 3,785,443 | 1/1974 | Armbruster | 74/371 X |
| 3,818,855 | 6/1974 | Shimanckas | 74/378 X |
| 3,827,510 | 8/1974 | Mazepa | 173/163 |
| 3,931,744 | 1/1976 | Wunsch | 173/48 |
| 4,098,351 | 7/1978 | Alessio | 173/48 X |
| 4,277,209 | 7/1981 | Benjamin et al. | 192/67 R X |
| 4,395,240 | 7/1983 | Blanchard | 74/372 X |
| 4,510,816 | 4/1985 | Linden | 74/323 X |
| 4,527,441 | 7/1985 | Nakahama | 74/378 |

FOREIGN PATENT DOCUMENTS 2057073  3/1981  United Kingdom .................. 74/378

Primary Examiner—Leslie Braun
Assistant Examiner—Dwight G. Diehl
Attorney, Agent, or Firm—Stuart E. Krieger

[57] ABSTRACT

The preferred embodiment can be incorporated into a powered instrument which rotates a tool. The preferred embodiment permits changing the direction of rotation of the tool without using the hand that does not grip the instrument housing to operate the tool, and without altering the grip on the instrument. The preferred embodiment includes an actuator which moves between two positions to selectively couple two rotating members to an output shaft. The output shaft is rotated in one direction when one rotating member is coupled to the shaft and is rotated in the remaining direction when the remaining rotating member is coupled to the shaft. Movement of the actuator between its two operative positions can be achieved by pushing on the instrument housing to push the tool against the workpiece, or by pulling the instrument housing away from the chuck if the tool is embedded within the workpiece.

4 Claims, 6 Drawing Figures

APPARATUS FOR DRIVING A MEMBER

BACKGROUND OF THE INVENTION

1. Field of the Invention

The invention relates generally to drive mechanisms and, more particularly, to apparatus for selectively rotating a member in either of two directions.

2. Description of the Prior Art

Powered surgical instruments that rotate surgical tools are often used during the performance of orthopedic surgical procedures. For example, a powered surgical instrument is often used to rotate drill bits, wire drivers and taps. A drill bit is used to form holes in bone which receive pins or screws. A wire driver can be driven into bone and subsequently removed to create a guide passage that receives a wire which secures together fragments of shattered bone. Further, the wire driver can be left in the bone and used as a guide for a hollow drill bit, which passes over the wire as the drill penetrates the bone, or to secure together pieces of bone. The tap is used to create a threaded passage in bone.

To employ the tools described above, the powered surgical tool must be able to rotate the tool selectively in either of two directions. Commonly, the tool is rotated in a forward direction to cause the tool to enter the bone, and in a reverse direction to permit the tool to be withdrawn from the bone. Accordingly, workers in the art have developed transmissions which employ a shaft that is rotated in a single direction by a motor to rotate an output shaft selectively in either of two directions. Benjamin et al. U.S. Pat. No. 4,277,209 discloses a threading attachment having a driver that can rotate a driven shaft, to which is mounted a tap, in either of two directions. However, the actuator of the driver that couples the driver to the members which drive the driven shaft in either of two directions must rotate with the driven shaft. Therefore, the rapid reversals of the direction of rotation which are often required when using a powered surgical instrument cannot be practically achieved with the driver shown in the Benjamin et al. patent. The device disclosed in U.S. Pat. No. 4,395,240 suffers from the same deficiency.

U.S. Pat. No. 4,510,816 discloses a transmission ("the Linden transmission") that has been incorporated into a commercially available powered surgical instrument. The Linden transmission is capable of performing rapid reversals of direction of the rotation of an output shaft, but it requires manual rotation of a sleeve to effect the reversal of rotation. The common manner of rotating the sleeve requires the use of the hand of the surgeon that is not grasping the instrument, which can cause the surgeon inconvenience during the performance of an orthopedic surgical procedure.

Therefore, there exists a need for apparatus for selectively rotating a member in either of two directions which permits rapid reversals of the direction of rotation of the member and which does not require manual manipulation of a member to achieve a rotation reversal.

SUMMARY OF THE INVENTION

The present invention provides an apparatus for rotating a member. The apparatus includes a frame and a driven member mounted to the frame that is adapted for rotation relative thereto. A first rotating member is provided for rotating the driven member in a first direction when the first rotating member is mechanically coupled to the driven member. A second rotating member is provided for rotating the driven member in a second direction when the second rotating member is mechanically coupled to the driven member. Coupling apparatus is provided for selectively mechanically coupling the rotating members to the driven member. An actuator causes the coupling apparatus to couple the first or second rotating members to the driven member. The actuator is free to rotate relative to the coupling apparatus and the driven member. The actuator is capable of movement between a first position in which the coupling apparatus couples the first rotating member to the driven member and a second position in which the coupling apparatus couples the second rotating member to the driven member. The driven member is adapted to be coupled to the rotated member and capable of assuming a first position relative to the frame in which the driven member causes the actuator to assume its first positon, and a second position relative to the frame in which the driven member permits the actuator to assume its second position. First biasing apparatus is provided for biasing the actuator toward its second position. Preferably, second biasing apparatus is provided for biasing the actuator toward its first position. Preferably, the second biasing apparatus is stronger than the first biasing apparatus.

The present invention provides a further apparatus for rotating a tool. The apparatus includes a frame and a driven shaft that is mounted for rotation relative to the frame. The driven shaft is adapted to be rigidly coupled to the tool. First and second members are provided which are mounted for rotation relative to the frame. Apparatus is provided for rotating the first and second members in opposite directions relative to each other. A control shaft is mounted for rotation relative to the frame and is mechanically coupled to the driven shaft to cause the driven shaft to rotate with the control shaft. A first coupler is capable of assuming a first position in which the control shaft is mechanically coupled to the first member and a second position in which the control shaft is not coupled to the first member. A second coupler is capable of assuming a first position in which the control shaft is mechanically coupled to the second member and a second position in which the control shaft is not coupled to the second member. An actuator moves the couplers between their respective positions. The actuator causes the first coupler to assume its first position and the second coupler to assume its second position when the actuator is in a first position, and causes the first coupler to assume its second position and the second coupler to assume its first position when the actuator is in a second position. The driven shaft is movable longitudinally between two positions. The driven shaft causes the actuator to assume its first position when the driven shaft assumes a first position. The driven shaft permits the actuator to be moved to its second position when the driven shaft assumes the second position. Biasing apparatus is provided for biasing the actuator toward its first position.

BRIEF DESCRIPTION OF THE DRAWINGS

The following detailed description of the preferred embodiments can be understood better if reference is made to the accompanying drawings, in which.

DETAILED DESCRIPTION OF THE PREFERRED EMBODIMENTS

Figure 1:
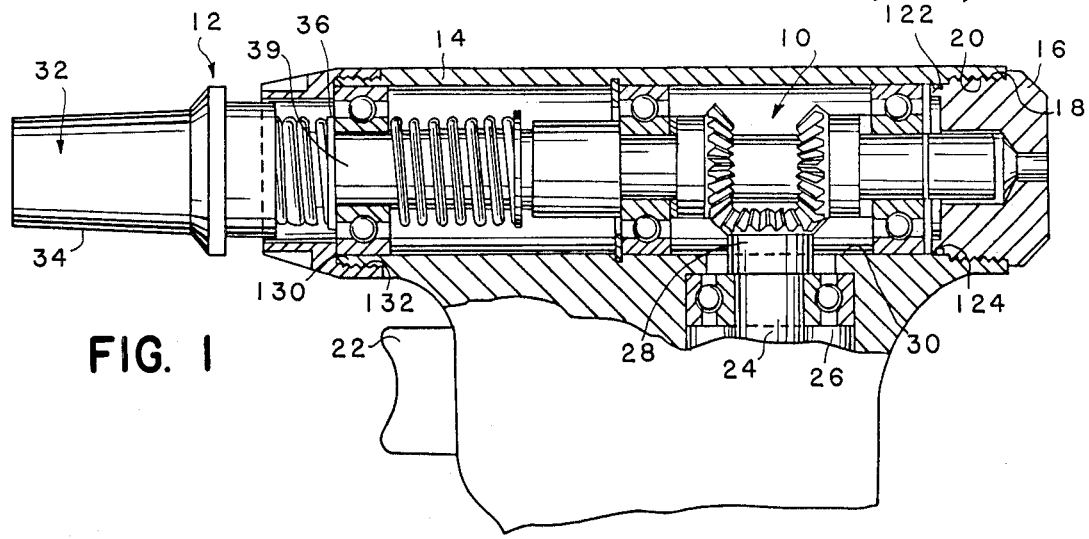
FIG. 1 is a view, partially in section, showing a portion of a powered surgical instrument in which the preferred embodiment of the present invention has been incorporated.

The figures show the preferred embodiment of the present invention as it is adapted for use in a powered surgical instrument. The surgical instrument rotates a chuck, to which a surgical tool can be attached, in either of two directions. The direction of rotation of the chuck depends on the direction of the force applied longitudinally to the chuck with the hand piece. If the surgeon pushes on the chuck with the hand piece, the chuck rotates in a clockwise, or forward, direction. If the surgeon pulls on the chuck with the hand piece, the chuck is rotated in a counterclockwise, or reverse, direction. Therefore, the surgeon can achieve a reversal of the direction of rotation of the chuck using only the hand that grips the surgical instrument and without altering the grip on the instrument.

The preferred embodiment is particularly useful for rotating a drill, a tap, or a wire driver. A wire driver is often used to (i) create in bone a narrow passage adapted to receive wires which, when disposed in the passage, hold together fragments of bone (ii) when left in the bone fragments, to serve as the means for holding the bone fragments together, or (iii) when left in the bone, to act as a guide for a hollow drill bit which passes over the drill and is guided by the wire driver. Drill bits are used to form holes in bone for a variety of well-known purposes. A tap is used to create a threaded passage in a bone which receives a threaded fastener.

The instrument is placed in its forward mode by placing the tip of the tool against a stationary object, such as a bone, and pushing against the chuck. Also, the preferred embodiment includes a spring that biases the preferred embodiment in its forward direction when no longitudinal force is exerted on the chuck. To permit movement of the housing away from the chuck, to exert a tensile force on the chuck and achieve a reversal of the direction of rotation, the chuck must be capable of providing resistance to the movement of the instrument housing. Drills, taps and wire drivers all provide resistance to pulling them out of bone when they are embedded in the bone. After the tool has become embedded in the bone, the surgeon can pull on the instrument, to pull on the chuck and cause the instrument to enter its reverse mode to facilitate removal of the tool from the bone.

The figures show a surgical instrument 12 that includes the driving apparatus 10 that constitutes the preferred embodiment of the present invention. Surgical instrument 12 includes a frame or housing 14. A decorative cap 16 defines a threaded portion 18 which is adapted to be threaded into threaded portion 20 defined by housing 14. A seal 122 is disposed within a recess 124 formed in cap 16 and cooperates with cap 16 to prevent matter from entering the interior of frame 14 through the rear of instrument 12. Instrument 12 includes a trigger actuator 22 which permits actuation of the motor of instrument 12.

When trigger 22 is depressed, the motor of instrument 12 causes drive shaft 24 to rotate in the clockwise direction. A ball bearing 26 permits rotation of drive shaft 24 with respect to frame 14 and prevents radial movement of drive shaft 24. One end of drive shaft 24 defines a bevel gear 28 which extends into a passage 30 defined by frame 14.

Figure 2:
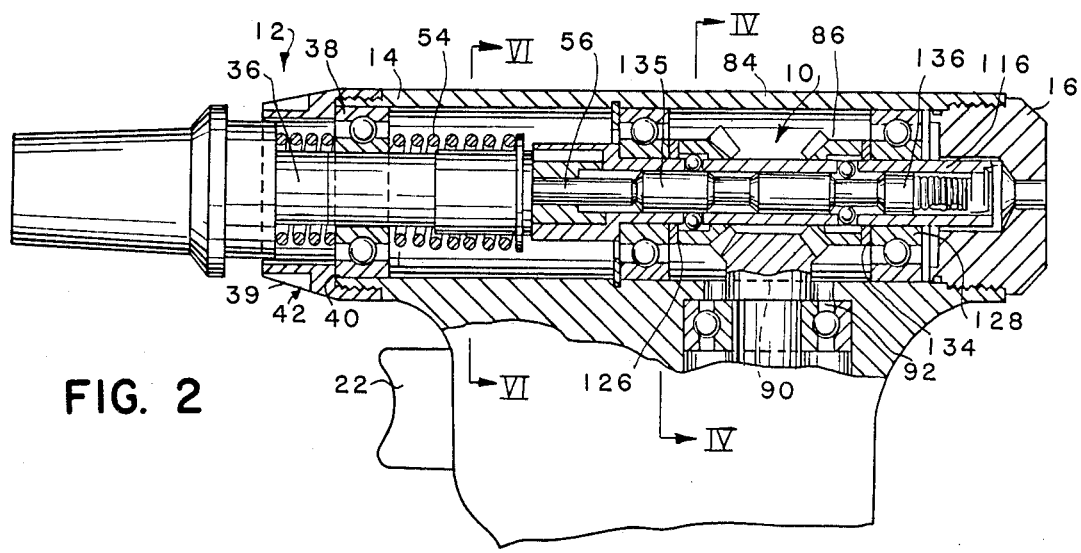
FIG. 2 is a view, partially in section, showing the preferred embodiment shown in FIG. 1 in its forward mode.
Figure 3:
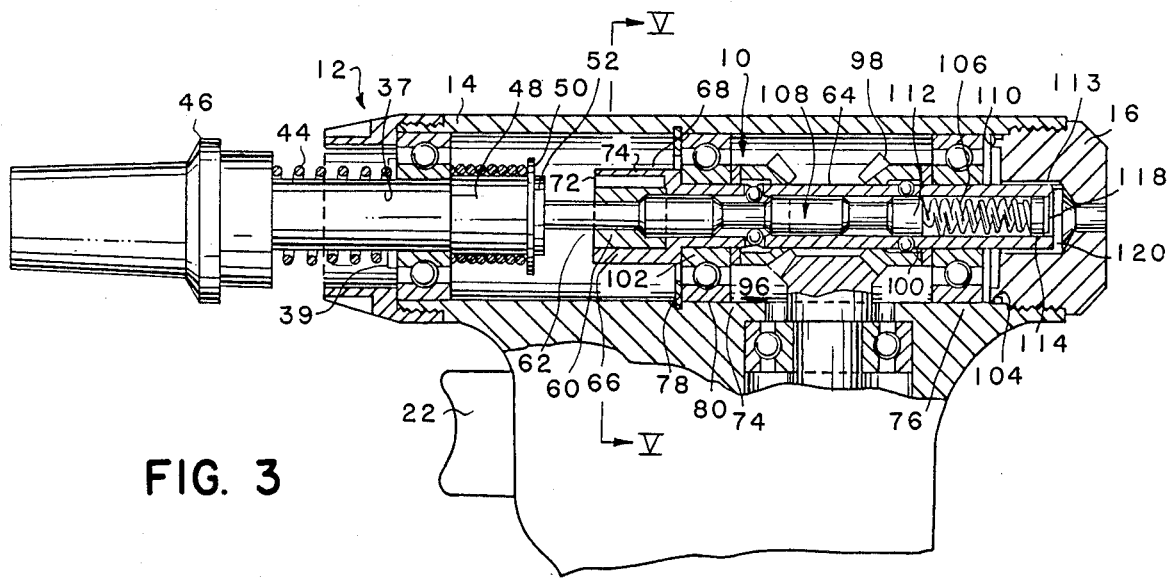
FIG. 3 is a view similar to that of FIG. 2, but with the preferred embodiment in its reverse mode.
Figure 4:
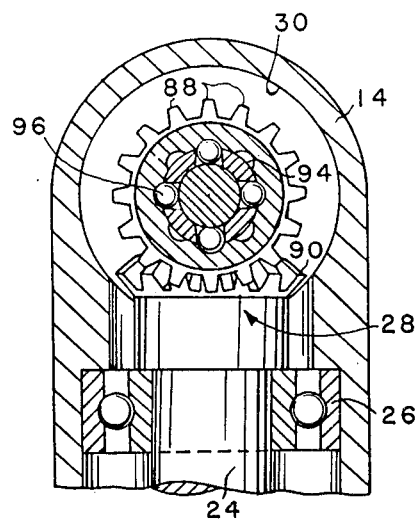
FIG. 4 is a view showing the preferred embodiment shown in FIG. 2 taken along the line IV—IV.
Figure 5:
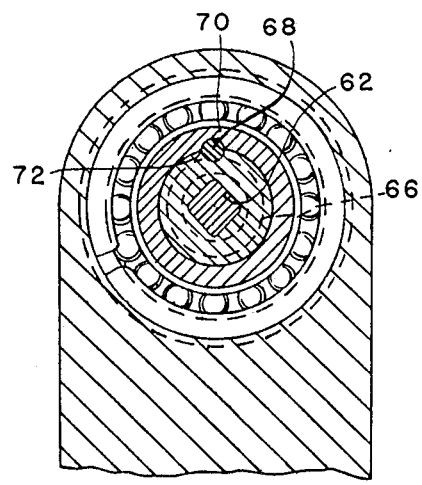
FIG. 5 is a view of the apparatus shown in FIG. 3, taken along the line V—V.
Figure 6:
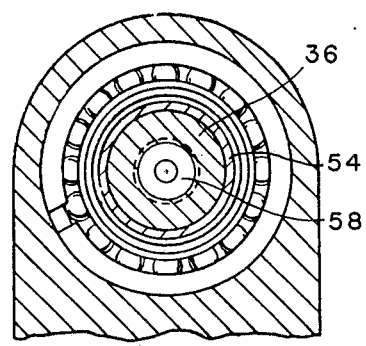
FIG. 6 is a section view of the apparatus shown in FIG. 2 taken along the line VI—VI.

A chuck 32 is provided for mechanically coupling a surgical tool to instrument 12. Chuck 32 can be of any known suitable type. However, the type of chuck shown in FIGS. 1 through 3 includes an inner sleeve (not shown) which is movable between two positions with respect to the exterior sleeve 34 of chuck 32. In a first position, the interior sleeve secures the shank of the tool within chuck 32, and in the second position the shank can be inserted into or removed from chuck 32. An output shaft 36 is secured at one end to chuck 32 and is mounted generally within chamber 30 by ball bearing 38. Ball bearing 38 is disposed around shaft 36 and is seated against the interior surface of frame 14 against a shoulder 40 that is formed by a nose piece 42. Shaft 36 defines an annular groove 37 which receives a retaining ring 39, which bears against bearing 38. Housing 14 defines a threaded portion 132 over which a threaded portion 130, which is defined by nose piece 42, can be threaded to secure nose piece 42 to housing 14. A spring 44 is disposed around output shaft 36. One end of spring 44 is supported by retaining ring 39 and the remaining end of spring 44 is supported by the inner sleeve of chuck 32. Spring 44 ensures that the inner sleeve is biased toward its position in which the tool is secured to chuck 32. To secure a tool to chuck 32, sleeve 34 is pushed toward nose piece 42 using annular member 46 of chuck 32 until the inner sleeve assumes its second position. The shank of a tool is inserted into chuck 32 and sleeve 34 is released. Spring 44 pushes sleeve 34 away from nose piece 42 until the inner sleeve assumes its first position and secures the tool to chuck 32.

A sleeve 48 is secured to output shaft 36 and limits the extent to which shaft 36 can be ejected from passage 30 of frame 14. A retaining ring 50 is secured to the surface of output shaft 36 adjacent end 52 of sleeve 48. A spring 54 is disposed around sleeve 48 between ball bearing 38 and retaining ring 50. A drive pin 56, which has a square cross section, defines a cylindrical plug 58 that is secured within drive shaft 36 to mount pin 56 to drive shaft 36. A coupling 60 defines a passage 62 that receives one end of drive pin 56. Accordingly, rotation of coupling 60 causes corresponding rotation of drive pin 56, output shaft 36, chuck 32 and any tool that is secured to chuck 32.

A transmission shaft or control shaft 64 defines a cylindrical passage 66 that receives coupling 60. A pin 68 is secured to both recess 70, which is formed by shaft 64, and recess 72, which is formed by coupling 60. Pin 68 prevents rotation of coupling 60 with respect to shaft 64. Shaft 64 is mounted for rotation within passage 30 by a pair of bearings 74 and 76, which bear against the interior surface of frame 14 that defines passage 30. A snap ring 78 is secured within a recess 80 formed in housing 14 and prevents movement of bearing 74 toward nose piece 42. A pair of bevel gears 84 and 86 are mounted to shaft 64 for rotation thereabout. Gear 84 defines teeth 88 which are adapted to mesh with teeth 90 of drive gear 28. Bevel gear 86 defines teeth 92 which are also adapted to mesh with teeth 90 of gear 28. Teeth 90, 88 and 92 are so arranged that rotation of shaft 24 and drive gear 28 causes rotation of gear 84 in a direction opposite to that in which drive shaft 24 rotates gear 86. Bevel gear 84 defines eight slots 94, each of which is adapted to receive a portion of a spherical coupler member or ball 96. Similarly, bevel gear 86 defines eight slots 98, each of which is adapted to receive a portion of a coupler ball 100. Each ball 96 and 100 is disposed generally within an opening 102 and 104, respectively. Balls 96 and 100 are prevented from passing completely into passage 106 defined by shaft 64 by actuator 108, which is located within passage 106. Actuator 108 is free to rotate with respect to both shaft 64 and drive pin 56. A spring 110, which is weaker than spring 54, is disposed within passage 106 between end 112 of actuator 108, and a shoulder 113 defined by a spring retainer 114. Spring retainer 114 is held in place by spring 110 and a clip ring 118 which is secured within a recess 120 defined by shaft 64. Spring 110 ensures that actuator 108 remains in contact with drive pin 56 during use of instrument 12.

A spacer 126 is disposed around shaft 64 between bearing 74 and gear 84 and cooperates with snap ring 78 to prevent longitudinal movement of bearing 74 with respect to housing 14. Similarly, a snap ring 128 is received by annular recess 116 which is defined by shaft 64 and cooperates with a spacer 134 to prevent longitudinal movement of bearing 76 with respect to frame 14.

Actuator 108 defines actuating portions 135 and 136. Actuating portion 135 cf actuator 108 forces balls 96 into four of slots 94 to couple shaft 64 to gear 84 when actuator 108 is in the position shown in FIG. 2. Actuating portion 136 of actuator 108 forces balls 100 into four of slots 98 to couple shaft 64 to gear 86 when actuator 108 is in the position shown in FIG. 3. Spring 54 causes actuator 108 to compress spring 110, which is weaker than spring 54, and enter its forward mode shown in FIG. 2 when no force is applied to chuck 32. Also, when a tool is secured within chuck 32 and the tool is pressed against a workpiece by exerting force on the instrument housing, chuck 32 cooperates with spring 54, through output shaft 36 and drive pin 56, to compress spring 110 and cause actuator 108 to assume the position shown in FIG. 2 and place driving apparatus 10 in its forward mode. Spring 110 forces actuator 108 into its reverse position when chuck 32 and drive pin 56 are in the positions shown in FIG. 3. Instrument 12 can be made to assume the position shown in FIG. 3 by mounting a tool to chuck 32, causing the instrument 12 to operate in its forward mode and to drive the tool into the workpiece, and then pulling instrument 12 away from the workpiece to pull housing 14 away from chuck 32.

What is claimed is:

1. Apparatus for rotating a member comprising:
    a frame;
    a driven member mounted to said frame and adapted for rotation relative thereto;
    a first rotating member adapted to rotate said driven member in a first direction when said first rotating member is mechanically coupled to said driven member;
    a second rotating member adapted to rotate said driven member in a second direction when said second rotating member is mechanically coupled to said driven member;
    means for selectively mechanically coupling said rotating members to said driven member;
    an actuator for causing said coupling means to couple said first or second rotating members to said driven member, said actuator being free to rotate relative to said coupling means and said driven member, said acutator being capable of movement between a first position in which said coupling means couples said first rotating member to said driven member, and a second position in which said coupling means couples said second rotating member to said driven member;
    said driven member being adapted to be coupled to either of said rotating members and capable of assuming a first position relative to said frame in which said driven member causes said actuator to assume its said first position, and a second position relative to said frame in which said driven member causes said actuator to assume its said second position, said first or second positions of said driven shaft being achievable through the application of compressive or tensile forces to said driven shaft; and
    first means for biasing said actuator toward its said second position.

2. The apparatus recited by claim 1 further comprising second means for biasing said actuator toward its said first position.

3. The apparatus recited by claim 2 wherein said second biasing means is stronger than said first biasing means.

4. Apparatus for rotating a tool comprising:
    a frame;
    a driven shaft that is mounted for rotation relative to said frame, said driven shaft being adapted to be rigidly coupled to the tool;
    first and second members mounted for rotation relative to said frame;
    means for rotating said first and second members in opposite directions relative to each other;
    a control shaft mounted for rotation relative to said frame and is mechanically coupled to said driven shaft to cause said driven shaft to rotate with said control shaft;
    a first coupler capable of assuming a first position in which said control shaft is mechanically coupled to said first member and a second position in which said control shaft is not coupled to said first member;
    a second coupler capable of assuming a first position in which said control shaft is mechanically coupled to said second member and a second position in which said control shaft is not coupled to said second member;
    an actuator for moving said couplers between their said positions, said actuator being free to rotate relative to said coupling means and said driven member, said actuator causing said first coupler to assume its said first position and said second coupler to assume its said second position when said actuator is in a first position, said actuator causing said first coupler to assume its said second position and said second coupler to assume its said first position when said actuator is in a second position;
    said driven shaft being movable longitudinally between two positions, said driven shaft causing said actuator to assume it said first position when said driven shaft assumes a first said position, said driven shaft permitting said actuator to be moved to its said second position when said driven shaft assumes a second said position, said first or second positions of said driven shaft being achievable through the application of compressive or tensile forces to said driven shaft; and means for biasing said actuator toward its said first position.

* * * * *